United States Patent
Carlson

(10) Patent No.: US 7,815,120 B2
(45) Date of Patent: Oct. 19, 2010

(54) ELECTRONIC SHUTTER FOR A DUAL-MODE IMAGER

(75) Inventor: Bradley S. Carlson, Huntington, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 18 days.

(21) Appl. No.: 12/333,844

(22) Filed: Dec. 12, 2008

(65) Prior Publication Data

US 2010/0147952 A1    Jun. 17, 2010

(51) Int. Cl.
*G06K 7/10* (2006.01)
(52) U.S. Cl. .................................. 235/462.41
(58) Field of Classification Search ............. 235/462.41
See application file for complete search history.

(56) References Cited

U.S. PATENT DOCUMENTS

2006/0118632 A1    6/2006  Joseph et al.
2006/0202036 A1*   9/2006  Wang et al. ............ 235/462.07
2007/0228174 A1   10/2007  Vinogradov et al.

OTHER PUBLICATIONS

Jacques Leconte; "Areascan Cameras: How to Choose Between Global and Rolling Shutter" Atmel Applications Journal, Winter 2066, Issue No. 6, pp. 37-39, Atmel Corporation, San Jose, CA.

* cited by examiner

*Primary Examiner*—Michael G Lee
*Assistant Examiner*—Tabitha Chedekel

(57) ABSTRACT

A method and imaging apparatus is provided for scanning and decoding a target object. The imaging apparatus (10) comprises a scanning arrangement (12) comprising a sensor assembly (22) for capturing an image from a target object. The sensor assembly (22) includes a sensor array (27) located within the sensor assembly. A programmable microprocessor (13) is located within and coupled to the scanning arrangement (12) that operates an electronic shutter (29) for controlling the exposure time of pixels (33) located in the sensor array (27). The electronic shutter (29) includes first and second modes of exposure. An image test control system (31) associated with the scanning arrangement (12) for evaluating lighting conditions surrounding the imaging apparatus (10) and selecting an optimum mode for imaging based on the evaluation between the first mode of exposure and the second mode of exposure.

17 Claims, 12 Drawing Sheets

ELECTRONIC SHUTTER FOR A DUAL-MODE IMAGER

TECHNICAL FIELD

The present disclosure relates to an imaging reader for imaging and decoding target indicia and, more particularly, an imaging reader comprising an electronic shutter camera assembly that automatically selects an optimum shutter mode based on environmental conditions surrounding the imaging reader.

BACKGROUND

Various electro-optical systems have been developed for reading optical indicia, such as barcodes. A barcode is a coded pattern of graphical indicia comprised of a series of bars and spaces of varying widths, the bars and spaces having differing light reflecting characteristics. The pattern of the bars and spaces encode information. Barcodes may be one dimensional (e.g., UPC barcode) or two dimensional (e.g., DataMatrix barcode). Systems that read, that is, image and decode barcodes employing imaging camera systems are typically referred to as imaging-based readers or scanners.

Imaging-based readers may be portable or stationary. A portable reader is one that is adapted to be held in a user's hand and moved with respect to target indicia, such as a target barcode to be read, that is, imaged and decoded. Stationary readers are mounted in a fixed position, for example, relative to a point-of-sales counter. Target objects, e.g., a product package that includes a target barcode are presented or swiped past one or more transparent windows and thereby pass within a field-of-view of the stationary readers.

The imaging based readers typically comprise a sensor or photodetector that collects light reflected from the target indicia located on an article or target object. The sensor or photodetector typically comprise charge coupled device (CCD) arrays, complementary metal oxide semiconductor (CMOS) arrays, or other imaging pixel arrays having a plurality of photosensitive elements or pixels.

Such photosensors electro-optically transform the graphic indicia into electrical signals, which are decoded into alphanumerical characters that are intended to be descriptive of the article or some characteristic thereof. A corresponding analog signal is generated by the photosensors that is decoded into a digital signal representative of the target indicia being read and is typically utilized as an input to a data processing system for various end-user applications such as point-of-sale processing, inventory control and the like.

In general, the photosensors discussed above require a source of illumination that is scattered across the target indicia within the photosensor's field-of-view (FOV) in order to produce the analog signal. A typical illumination system comprises light emitting diodes (LEDs), cold cathode florescent lamps (CCFLs), and the like that act as an illumination source for the imaging reader. The light reflected from the target indicia is focused through a system of one or more lenses of the imaging system onto the photosensors or sensor array. Thus, the target indicia within a FOV of the imaging lens system is focused on the photosensors or sensor array. Typically, for imaging 2D bar codes, two dimensional (2D) sensor arrays are utilized wherein a light receiving surface of the sensor array comprise multiple rows of light receiving photosensitive pixels.

SUMMARY

One example embodiment of the present disclosure includes an imaging system for scanning and decoding a target object. The imaging system comprises a scanning arrangement having a sensor assembly for capturing an image from a target object. The sensor assembly includes a field-of-view focused by an optical arrangement onto a sensor array located within the sensor assembly. A programmable microprocessor is located within and coupled to the scanning arrangement that operates an electronic shutter for controlling the exposure time of pixels located in the sensor array. The electronic shutter has first and second modes of exposure. The system further comprises an image test control system associated with the scanning arrangement for evaluating lighting conditions surrounding the imaging system and selecting an optimum mode for imaging based on the evaluation between the first mode of exposure and the second mode of exposure.

Another example embodiment of the present disclosure includes a method for selecting an optimum electronic shutter mode used for imaging and decoding a target object with an imaging reader. The method comprises capturing a test image of a target object with an imaging reader having an electronic shutter operating in a first exposure mode. The method further comprises measuring the ambient lighting surrounding the imaging reader during the capturing of the test image of the target object with a processor located within a scanning arrangement of the imaging reader. The method also comprises evaluating the measured ambient lighting with the processor against a prescribed threshold programmed in the processor. The method also includes switching the electronic shutter mode from the first exposure mode to a second exposure mode when the measured ambient lighting is greater than the prescribed threshold for future imaging operations and maintaining the electronic shutter mode in the first exposure mode when the measured ambient lighting is less than the prescribed threshold for future imaging operations.

A further example embodiment of the present disclosure includes a method for selecting an optimum electronic shutter mode used for imaging and decoding a target object with an imaging reader. The method comprises capturing a test image of a target object with an imaging reader having an shutter means operating in a first exposure mode and measuring the ambient lighting surrounding the imaging reader during the capturing of the test image of the target object with a processing means coupled to the imaging reader. The method further comprises evaluating the measured ambient lighting with the processing means against a prescribed threshold programmed in the processing means. The method also includes switching the shutter means mode from the first exposure mode to a second exposure mode when the measured ambient lighting is at or less than a programmed value from the prescribed threshold for future imaging operations and maintaining the shutter means mode in the first exposure mode when the measured ambient lighting is greater than said programmed value from the prescribed threshold for future imaging operations.

A yet further example embodiment of the present disclosure includes an imaging reader for scanning and decoding a target object. The imaging reader comprises a scanning arrangement comprising a sensor assembly for capturing an image from a target object, the sensor assembly includes a field-of-view focused by an optical arrangement onto a sensor array located within the sensor assembly. The imaging reader further comprises a programmable microprocessor located within and coupled to the scanning arrangement that operates an electronic shutter for controlling the exposure time of pixels located in the sensor array, the electronic shutter having a global shutter mode and a rolling shutter mode. The imaging reader also comprises an image test control system associated with the scanning arrangement for evaluating lighting conditions surrounding the imaging system and for assigning a brightness value base on the evaluation. The image test control system further selects an optimum mode for future images by the imaging reader based on the brightness value by selecting between the global shutter mode and the rolling shutter mode. A threshold is programmed into the microprocessor such that if the brightness value is at or less than a programmed value in the microprocessor from the threshold the electronic shutter is switch from the global shutter mode to the rolling shutter mode for future imaging operations and if the brightness value is greater than said programmed value in the microprocessor from the threshold the electronic shutter mode is set at the global shutter mode for future imaging operations.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

DETAILED DESCRIPTION

The present disclosure relates to an imaging reader for imaging and decoding target indicia and, more particularly, an imaging reader having an electronic shutter camera assembly that automatically selects an optimum shutter mode based on environmental conditions surrounding the imaging reader. In one example embodiment, the imaging reader automatically and optimally selects between one of a rolling shutter mode of operation and a global shutter mode of operation depending on ambient lighting conditions.

Imaging readers typically utilize electronic shutters to determine exposure time of the pixels of the sensor array. An electronic shutter means that no physical shutters are activated, rather exposure durations for pixel rows of the sensor array are all controlled by electronically activating and deactivating the pixels of the sensor array. Two types of electronic shutter modes of operation are typically employed with two dimensional (2D) sensor arrays, namely, a rolling shutter and a global shutter. Additional discussion of electronic shutter modes is provided in Applicant's U.S. patent application Ser. No. 11/862,583 filed Sep. 27, 2007 entitled IMAGING-BASED BAR CODE READER UTILIZING MODIFIED ROLLING SHUTTER OPERATION, which is assigned to the assignee of the present application and incorporated herein by reference in its entirety.

Figure 1:
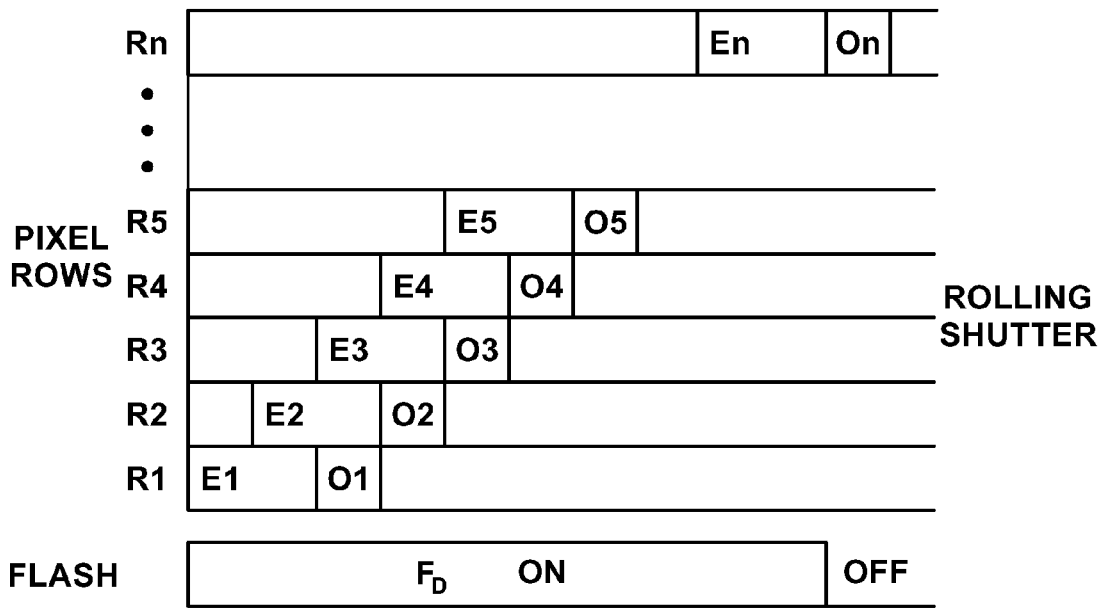
FIG. 1 is a schematic exposure and readout timing diagram of a rolling shutter method of operation utilizing a 2D sensor array.

In a rolling shutter mode of operation, all rows of pixels in the sensor array are exposed at different times. This is shown schematically in FIG. 1, where pixel rows R1, R2, R3, . . . , Rn are exposed for respective exposure times E1, E2, E3, . . . , En. As can be seen, the row exposure times E1, E2, . . . , En are sequential, that is, the exposure times of adjacent rows, e.g., E1 and E2 for rows R1 and R2, are staggered. While the exposure times of adjacent rows may overlap, the commencement of the exposure time for each row is offset and sequentially later than the commencement of the exposure time for the preceding row. Readout of a row commences after completion of the exposure time for the row. This is shown as O1 for readout of row R1, O2 for readout of row R2, etc., as illustrated in FIG. 1.

Figure 9:
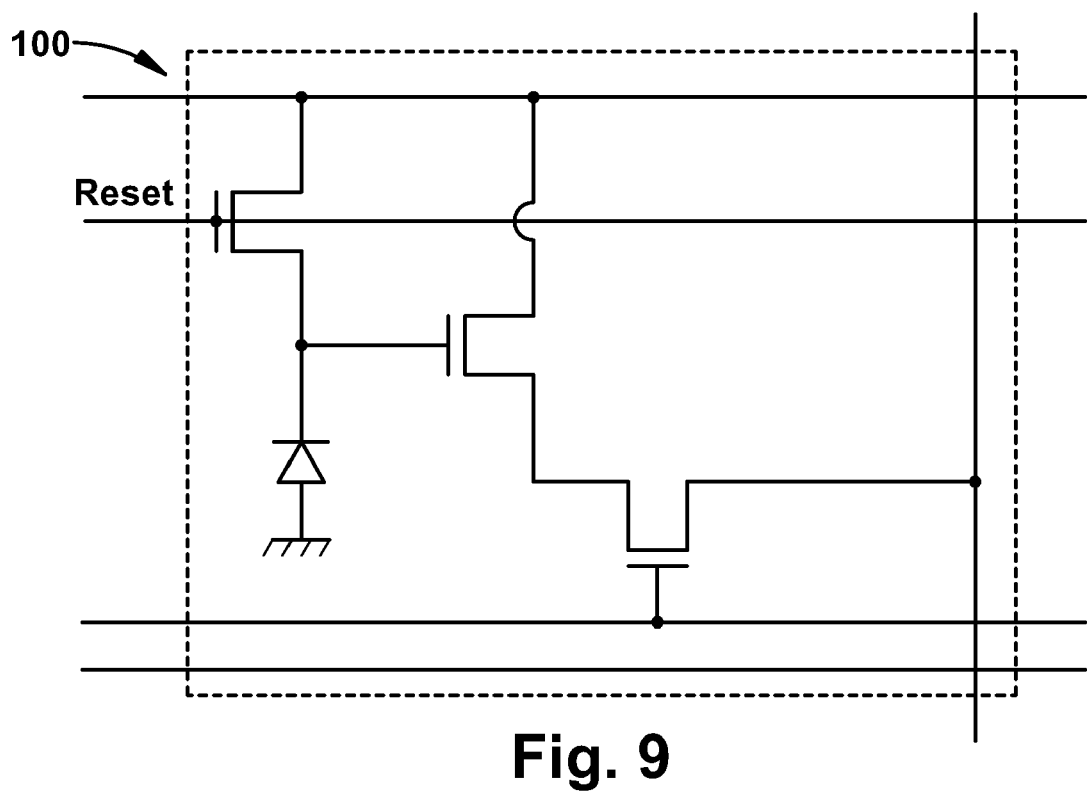
FIG. 9 is a schematic circuit diagram for the rolling shutter mode pixel structure for a representative pixel.

In a rolling shutter mode, if active illumination or flash is used (emitted by an illumination system of the imaging reader), the flash must be long enough in duration to cover the combined exposure period of all the pixel rows. This active illumination or pulse/flash is shown as $F_D$ in FIG. 1. The rolling shutter mode of operation is easy and inexpensive to implement and requires only three transistors at the pixel level, as illustrated in FIG. 9. Additionally, rolling shutter has been found to provide good signal-to-noise ratio and is more tolerant of imaging lens systems utilizing wide aperture lenses. Because the sequential exposure sequence E1, E2, . . . En of the pixel rows R1, R2, . . . Rn, additional time, relative to the global shutter mode (as discussed below) for an illumination source, such as a flash is required when the environmental conditions are such that the ambient light is not sufficient to provide a quality image in an imaging reader. Therefore, as a matter of power conservation and an increase in the quality of the target indicia to be imaged, the imaging readers of the present disclosure are switched to a rolling shutter mode an image test system (as discussed below) determines when ambient lighting is sufficient for obtaining quality images without using an illumination source, such as an LED.

In the rolling shutter readout mode, readout of a pixel resets the pixel charge. Depending on the required speed, the chosen integration time might be shorter or longer than the frame readout time. The rolling shutter mode is easy to implement and requires only three transistors at the pixel level allowing a good signal to noise ratio. A simplified circuit diagram for the rolling shutter pixel structure for a representative pixel is shown generally at 100 in FIG. 9. A more detailed description of the rolling shutter sensor configuration is disclosed in U.S. application Ser. No. 11/700,657, filed Jan. 31, 2007 and entitled "Dual Camera Assembly for an Imaging-Based Bar Code Reader". The '657 application is assigned to the assignee of the present invention and is incorporated herein in its entirety by reference.

In a global shutter mode of operation, all pixel rows have a common, simultaneous exposure time. This is shown schematically in FIG. 2, where pixel rows R1, R2, R3, ..., Rn are exposed for respective exposure times E1, E2, E3, ..., En. As can be seen, the row exposure times E1, E2, ..., En overlap or are congruent, that is, the exposure times for each row occur at the same time. At the end of exposure time, pixel content is stored in a respective memory beside each pixel, or in a dedicated frame storage area, and then a readout commences on a row by row basis. This readout is schematically shown as O1, O2, O3, ..., On in FIG. 2. In a global shutter mode of operation, because all pixel rows have a common, simultaneous exposure time, a short duration pulse or flash (shown as $F_D$) may be used to illuminate the target indicia, such as a barcode.

Because global shutter mode requires a memory for each pixel of the sensor array, additional electronics in the form of at least one additional transistor for each pixel are required for a sensor array configured to operate in global shutter mode as compared to rolling shutter mode. Additionally, the global shutter memory must be non-sensitive meaning no light leakage is permitted. Thus, while global shutter has certain advantages over the rolling shutter mode of operation in terms of short flash duration, global shutter is more costly and difficult to implement. However, the global shutter mode provides advantages of power conservation because the duration of the scanner-generated illumination is minimized as a result of the coincident exposure of the pixel rows and the tolerance to the scanner motion is maximized. Therefore, when environmental conditions are such that the ambient light is not enough to provide a quality image in the imaging reader of the present disclosure, the global shutter mode should be employed in the imaging reader of the present disclosure.

A discussion and comparison of global and rolling shutter readout structures may be found in an article entitled "Areascan Cameras: How to Choose Between Global and Rolling Shutter" by Jacques Leconte, Camera & Application Development Manager, Atmel, appearing in *Atmel Applications Journal*, Issue 6, Winter 2006, pages 37-39, Atmel Corporation, San Jose, Calif. 95131 (www.atmel.com). The aforesaid Atmel Applications Journal article is incorporated herein in its entirety by reference.

Figure 3:
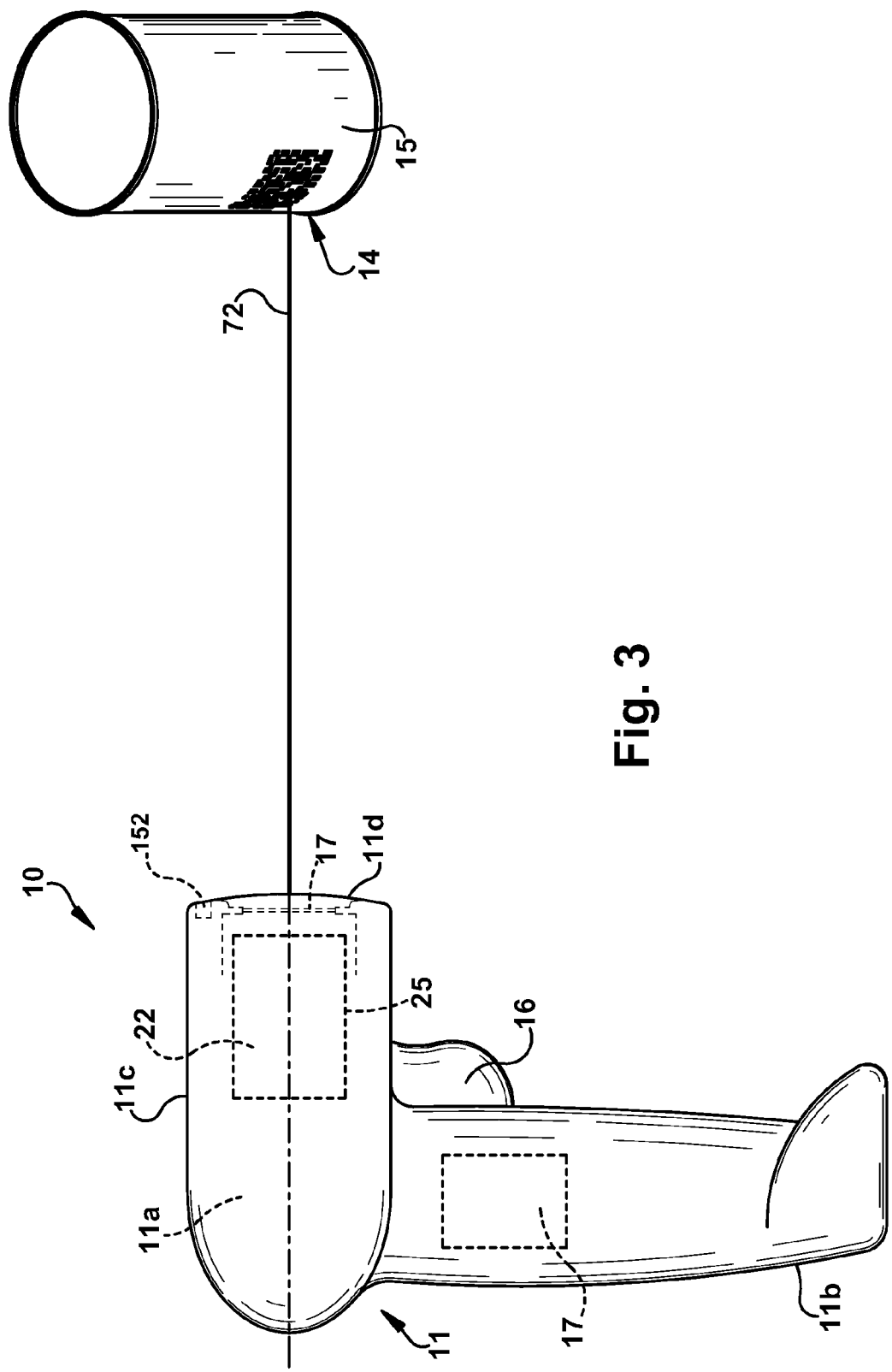
FIG. 3 is a side elevation view of an imaging reader constructed in accordance with one example embodiment of the present disclosure represented by a hand-held scanner.
Figure 5:
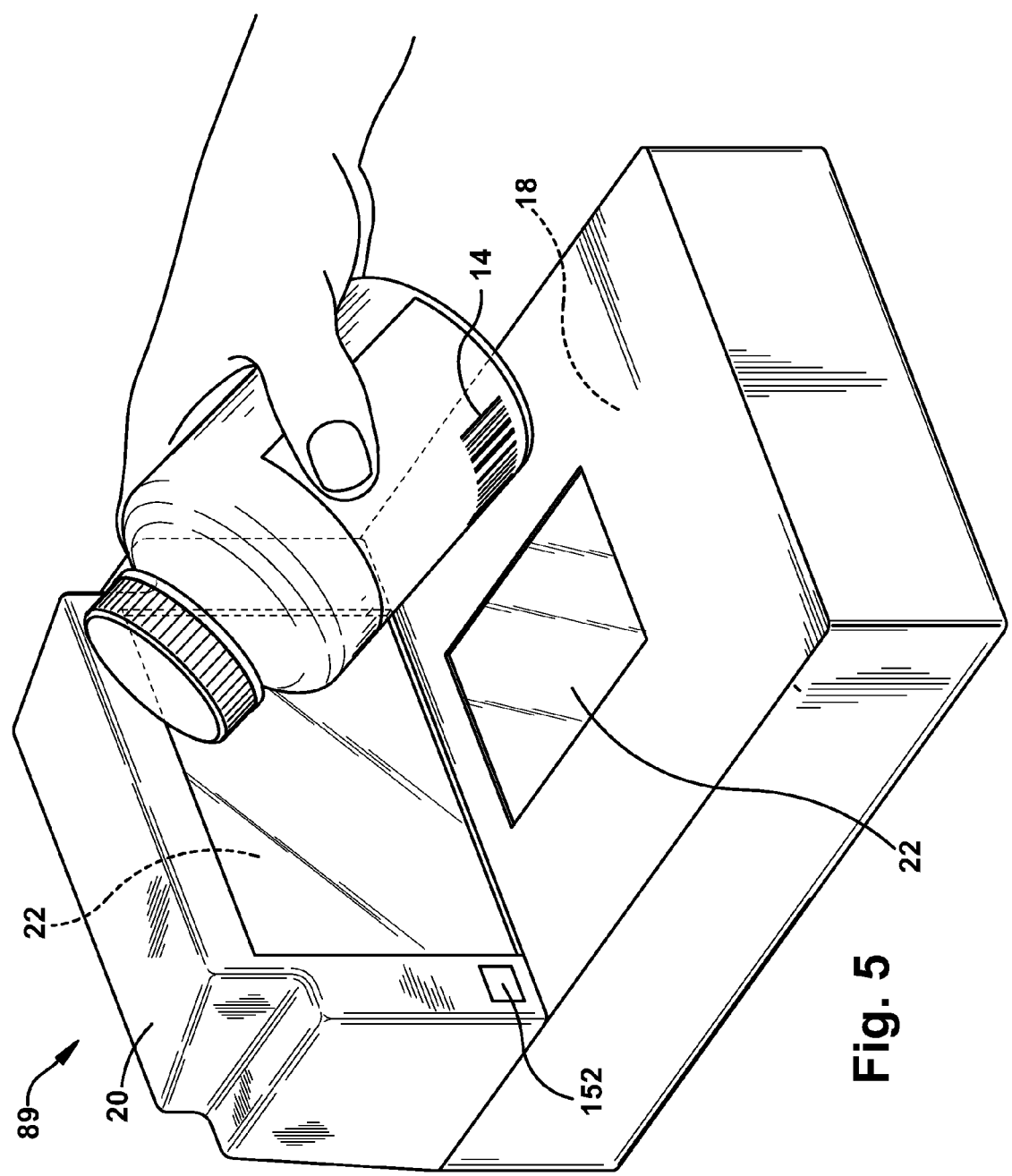
FIG. 5 is a perspective view of an imaging reader constructed in accordance with another embodiment of the present disclosure represented by a presentation type scanner.
Figure 8:
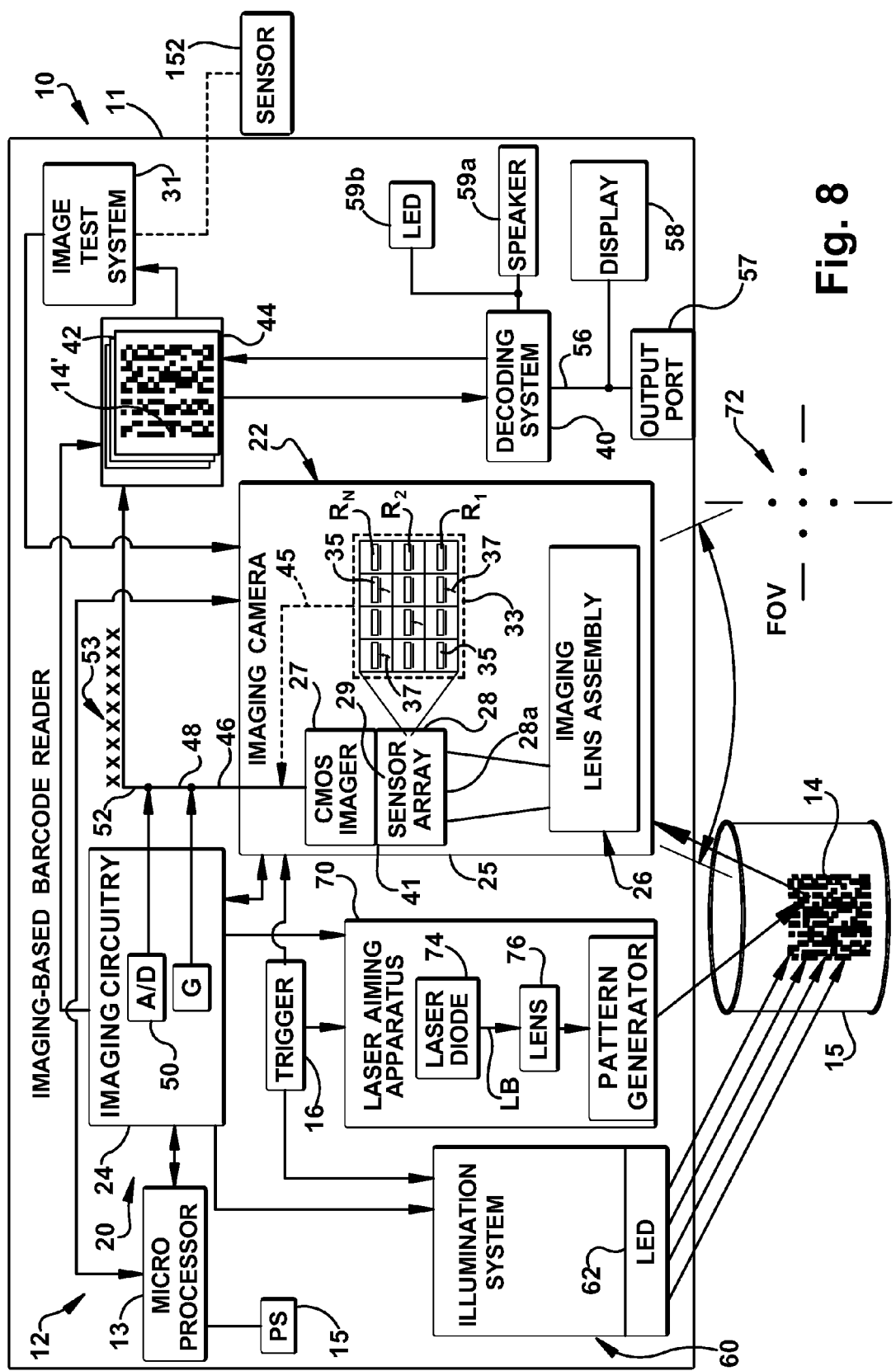
FIG. 8 is a block diagram of an imaging reader constructed in accordance with one example embodiment of the present disclosure.

Referring again to the figures and in particular to FIG. 3 is an exemplary embodiment of an imaging reader of the present disclosure is shown schematically at 10 in the form of a hand-held scanner. FIG. 5 illustrates a separate example embodiment of the present disclosure wherein the imaging reader 10 is the in form of a presentation scanner. The imaging reader 10, in addition to imaging and decoding both 1D and 2D bar codes and postal codes, is also capable of capturing images and signatures. FIG. 8 illustrates a block diagram of the internal operation of the imaging reader 10 constructed in accordance with one example embodiment of the present disclosure. The imaging reader 10 includes an imaging system 20 and a decoding system 40, both illustrated in FIG. 8 for capturing image frames of a field-of-view FOV of the imaging system and decoding encoded indicia within a captured image frame. In the illustrated embodiment of FIG. 3, the imaging reader 10 includes a housing 11 supporting the imaging and decoding systems 20, 40 within an interior region 11a of the housing 11.

Figure 6:
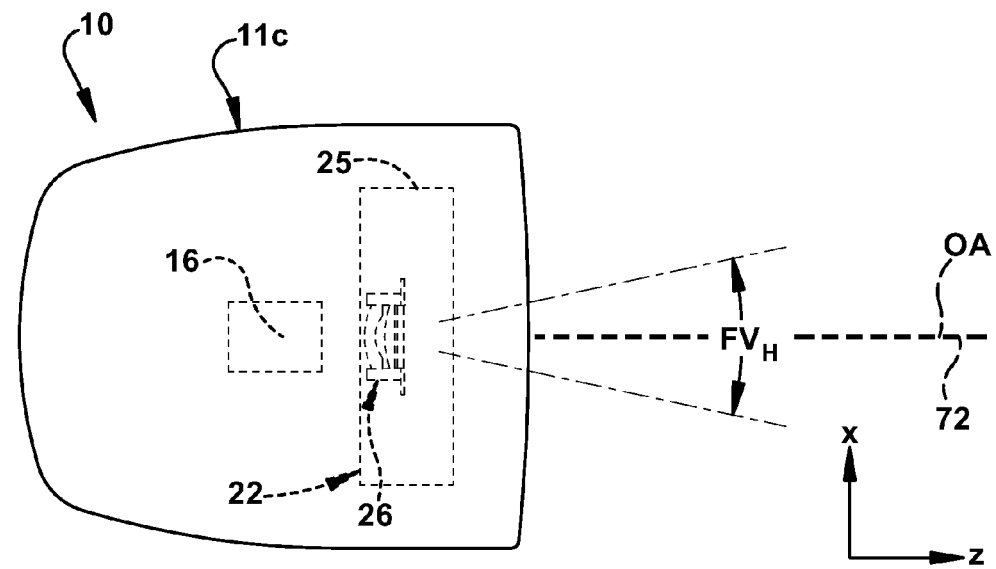
FIG. 6 is a schematic top view of the imaging reader constructed in accordance with the example embodiment of FIG. 3.

Referring again to FIG. 8, the imaging and decoding systems 20, 40 operate as part of reader circuitry 12 that includes a microprocessor 13. The imaging system 20 comprises and an imaging camera assembly 22 and associated imaging circuitry 24. The imaging camera 22 includes a housing 25, as best seen in the top and sectional views of FIGS. 6 and 7, respectively of the hand-held imaging reader example embodiments of FIGS. 3 and 4. The housing 25 supports an imaging lens assembly 26 and an imager 27 comprising a sensor array 28, such as a complementary metal oxide (CMOS) sensor array. Advantageously, the sensor array 28 is configured with an electronic shutter 29 for autonomous switching the sensor array 28 between rolling shutter and global shutter modes (as further discussed below in detail).

The imager 27 is enabled to capture an image of the field-of-view FOV of the imaging camera assembly 22. Each row R1, R2, R2, ..., Rn of the sensor array 28 is comprised of a group of photosensitive pixels 33, which are enabled during an exposure period for the row and, during the exposure period, accumulate charge on individual pixels in proportion to the intensity or brightness of the light incident on each of the individual pixels in the group of pixels.

Advantageously, the imaging camera 22 is modular, that is, enclosed within the camera housing 25 and capable of being installed in the reader housing 11 of a portable scanner (see FIG. 3) or in a presentation type scanner (see FIG. 5) as a single unit. In one example embodiment of the present invention, the imaging reader 10 is a hand held portable reader (illustrated in FIG. 3) encased in the pistol-shaped housing 11 adapted to be carried and used by a user walking or riding through a store, warehouse or plant for reading bar codes for stocking and inventory control purposes. However, it should be recognized that the imaging reader 10 of the present disclosure is equally useful in other types of bar code readers or scanners, such as a a presentation or stationary type scanner 89 illustrated in FIG. 5 or a hand-held computer containing a bar code reader or a bar code reader that can used in a hand-held mode or inserted in a docking station for use in a fixed-position mode.

Figure 4:
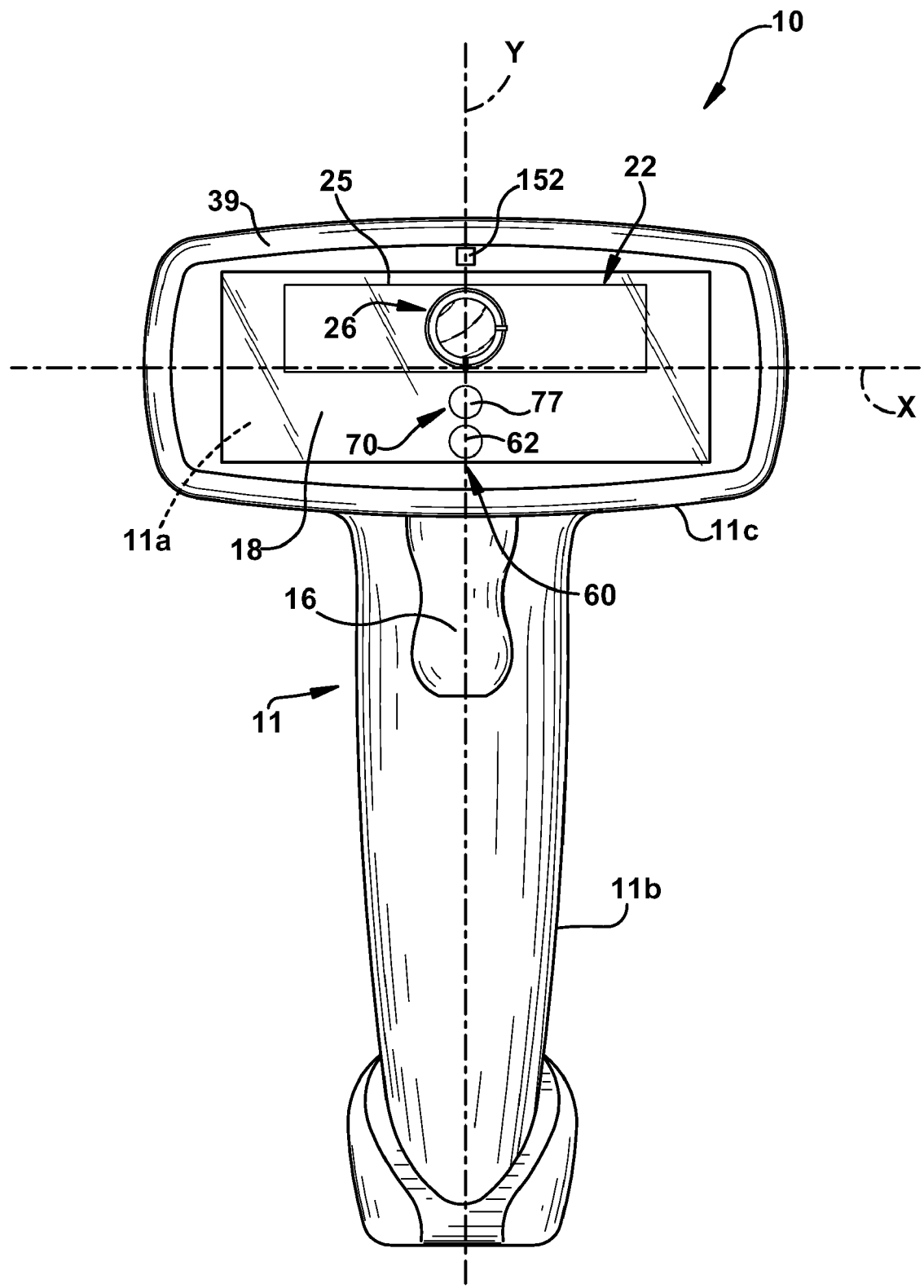
FIG. 4 is a front elevation view of the imaging reader constructed in accordance with the example embodiment of FIG. 3.

As is best seen in FIGS. 3 and 4, the imaging reader housing 11 includes a generally upright gripping portion 11b adapted to be grasped by a user's hand and a horizontally extending scanning head 11c which supports the imaging assembly 20, an illumination assembly 60 and an aiming apparatus 70. At the intersection of gripping portion 11b and the scanning head 11c is a trigger 16 coupled to imaging reader circuitry 12 for initiating reading of target indicia, such as the target bar code 14, when the trigger 16 is pulled or pressed. The imaging reader circuitry 12, the imaging system 20 and the decoding circuitry 40 are coupled to a power supply 15 (see FIG. 8), which may be in the form of an on-board battery or a connected off-board power supply. If powered by an off-board power supply, the imaging reader 10 may be a stand-alone unit or have some or all of the scanner's functionality provided by a connected host device.

When actuated to read the target indicia, such as a barcode 14, the imaging system 20 images a field-of-view FOV (shown schematically in FIG. 8) of the imaging system 20 and generates a series of image frames 42, which are stored in a memory 44. The field-of-view FOV of the imaging system 20 is determined by the optical characteristics of the imaging lens assembly 26 and the size and light receiving active area of the sensor array 28. The-field of-view FOV includes a horizontal field-of-view FVH (shown schematically in FIG. 6) and a vertical field of view FVV (shown schematically in FIG. 7).

If the target indicia 14 is within the field-of-view, the target indicia during a reading session where the imaging system 20 is activated, each of the image frames of the series of captured image frames 42 will include a full or partial image 14' (shown schematically in FIG. 8) of the target indicia 14. Utilizing one or more of the captured image frames 42, the decoding system 40 operates to decode the digitized image 14' of the target indicia 14.

The imaging and decoding circuitry 24, 40 may be embodied in hardware, software, firmware, electrical circuitry or any combination thereof. The imaging circuitry 24 may be disposed within, partially within, or external to the camera assembly housing 25. Shown schematically in FIG. 7, the imaging camera housing 25 is supported with the scanning head 11c of the housing 11 and receives illumination from the field-of-view FOV, including reflected illumination from the target indicia 14, through a transparent window 18 (FIGS. 4 & 7) supported by the scanning head 11c.

Imaging and Decoding

The imaging system 20 includes the imager 27 of the imaging camera assembly 22. The imager 27 comprises a complementary metal oxide semiconductor (CMOS), or other imaging pixel array, operating under the control of the imaging circuitry 24. In one exemplary embodiment, the sensor array 28 of the CMOS imager 27 comprises a two dimensional (2D) mega pixel array with a typical size of the pixel array being on the order of 1280×1024 pixels. The pixel array 28 is secured to the printed circuit board 25b (FIG. 7), in parallel direction for stability. The 2D sensor array 28 is adapted to provide high resolution imaging of 2D target bar codes having high density bar code features, for example, successfully imaging (to permit decoding) of bar code features on the order of 4-5 mils over an extended range.

Figure 7:
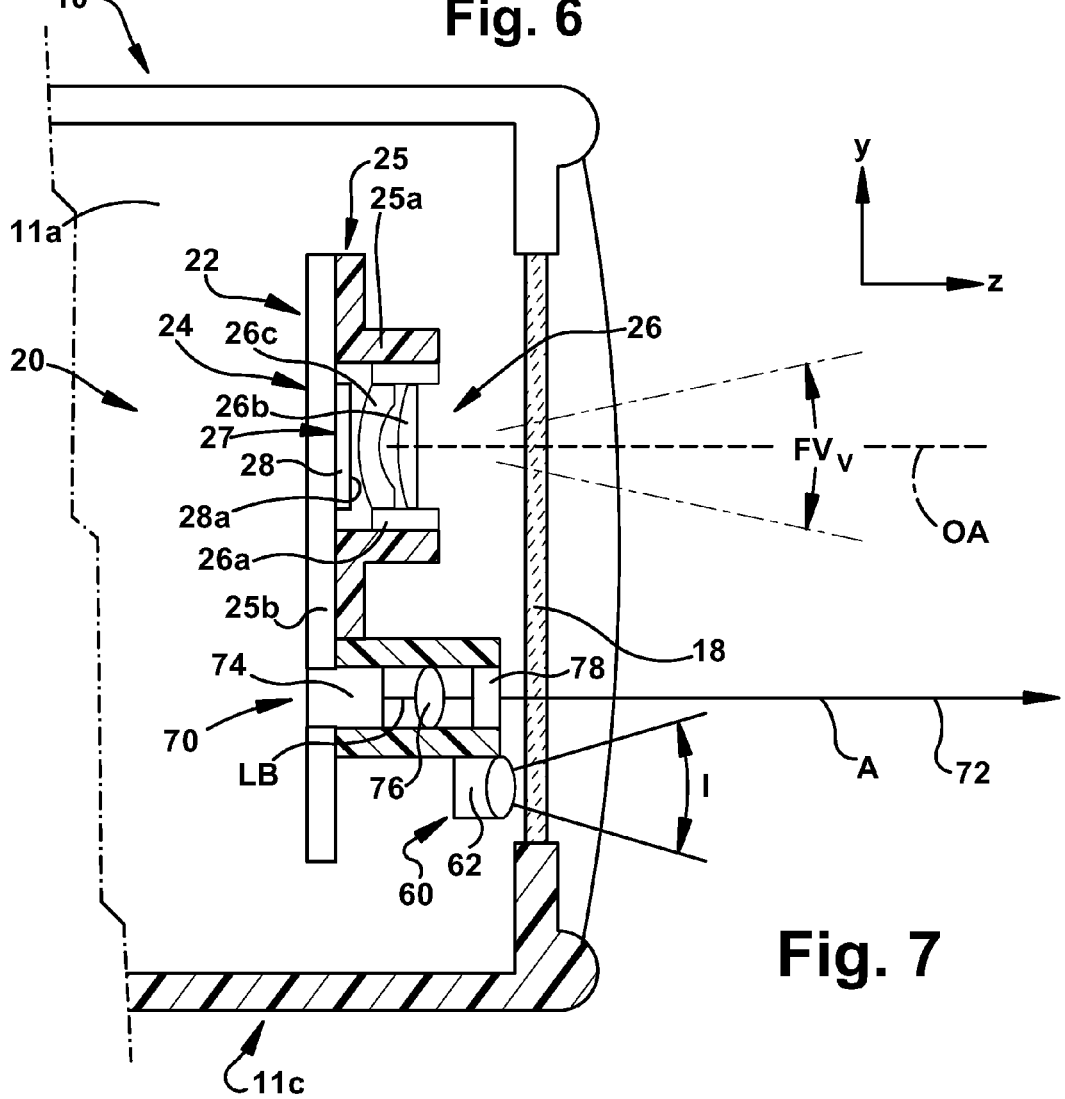
FIG. 7 is a schematic sectional view of a portion of the imaging reader constructed in accordance with the example embodiment of FIG. 3.

As is best seen in FIG. 7, the imaging lens assembly 26 focuses light reflected from the target indicia 14 through one or more apertures and/or lenses 26b, 26c onto the sensor array 28. Thus, the imaging lens assembly 26 focuses an image of the target indicia 14 (assuming it is within the field-of-view FOV) onto the array of pixels comprising the sensor array 28. The lenses 26b and 26c of the imaging lens assembly are supported in a lens holder 26a, which, in turn, is supported by a light blocking shroud 25a affixed to the vertical printed circuit board 25b.

Figure 2:
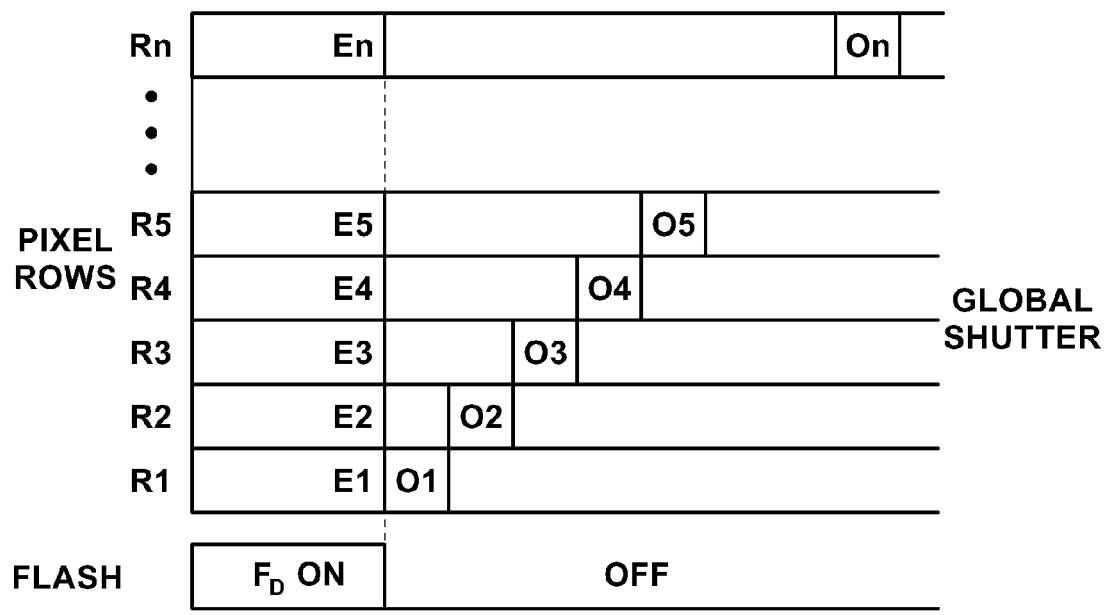
FIG. 2 is a schematic exposure and readout timing diagram of a global shutter method of operation utilizing a 2D sensor array.

The sensor array 28 is configured with the electronic shutter 29 (see FIG. 8) for autonomously switching from a default global shutter mode to a rolling shutter mode when an image test system 31 (as discussed below) determines ambient lighting is sufficient for obtaining quality images without using an illumination source such as an LED. In the present disclosure the image test system 31 advantageously controls the imaging reader 10 to operate in a selected one of a rolling shutter mode or method of operation (FIG. 1) or in a global shutter mode or method of operation (FIG. 2). The image test system 31 is part of the imaging system circuitry 24 and assures that the quality of the series of image frames 42 generated by the camera assembly 22 to determine is the captured image frames 42 are of sufficient quality as to be decodable if the frames include an image 14' of the target bar code 14.

An analog electrical signal 46 (FIG. 8) is generated by reading out of accumulated electrical charges on a pixels-by-pixel basis for successive rows of pixels R1, R2, R3, . . . , Rn of the sensor array 28 after an exposure period E1, E2, E3, . . . , En. The read out of electrical charges on the pixels on a row by row basis is shown as O1, O2, O3, . . . , On in FIGS. 1 and 2. Readout of pixel rows R1, R2, . . . , Rn are representative of an image frame 42 of the field of view FV. During a reading session, the series of image frames 42 are generated and stored in buffer memory 44, as is shown in FIG. 8.

The analog image signal 46 represents a sequence of photosensor voltage values, the magnitude of each value representing an intensity of light received by a photosensor/pixel during an exposure period. The analog signal 46 is amplified by a gain factor, generating an amplified analog signal 48. The imaging circuitry 24 further includes an analog-to-digital (A/D) converter 50. The amplified analog signal 48 is digitized by the A/D converter 50 generating a digitized signal 52. The digitized signal 52 comprises a sequence of digital gray scale values 53 typically ranging from 0-255, where a 0 gray scale value would represent an absence of any reflected light received by a pixel (characterized as low pixel brightness) and a 255 gray scale value would represent a very intense level of reflected light received by a pixel during an integration period (characterized as high pixel brightness).

The digitized gray scale values 53 of the digitized signal 52 are stored in the memory 44. The digital values 53 corresponding to a read out of the pixel array 28 constitute the image frame 42, which is representative of the image projected by the imaging lens system 26 onto the sensor array 28 during an exposure period. If the field of view FV of the imaging lens system 26 includes the target bar code 14, then a digital gray scale value image 14' of the target bar code 14 would be present in the series of image frames 42.

The decoding circuitry 40 then operates on the digitized gray scale values 53 of a selected one or more of the series of image frames 42 and attempts to decode any decodable image within the image frame, e.g., the imaged target bar code 14'. If the decoding is successful, decoded data 56, representative of the data/information coded in the bar code 14 is then output via a data output port 57 and/or displayed to a user of the reader 10 via a display 58. A more detailed description of imaging and decoding is set forth in U.S. Ser. No. 11/032,767, filed Jan. 10, 2006 and entitled "Barcode Scanner Decoding." U.S. Ser. No. 11/032,767 is assigned to the assignee of the present invention and is incorporated herein in its entirety by reference.

Upon achieving a good "read" of the bar code 14, that is, the bar code 14 was successfully imaged and decoded, a speaker 59a and/or an indicator LED 59b is activated by the bar code reader circuitry 12 to indicate to the user that the target bar code 14 has successfully read, that is, the target bar code 14 has been successfully imaged and the imaged bar code 14' has been successfully decoded.

Obviously, if a single image frame 42 includes a decodable portion that is representative of or corresponds to the entire imaged target bar code 14' and thereby allows complete decoding of the target bar code in one image frame 42, the decode is complete and a signal for successful decode is generated to activate the speaker 59a and/or LED indicator 59b to let the operator know that decoding of the target bar code 14 has been completed. However with high density bar codes, such as bar code 14a, this will rarely occur because of PPM (pixel per module) limitations. Thus, a series of images 43 may need to be obtained, analyzed and partial decodes combined or stitched together utilizing a stitching method to achieve a complete decode. A suitable stitching method is disclosed in U.S. patent application Ser. No. 11/395,596, filed Mar. 31, 2006 and entitled "Imaging-Based Bar Code Reader Utilizing Stitching Method and Swipe Guide". U.S. patent application Ser. No. 11/395,569 is assigned to the assignee of the present invention and is incorporated herein in its entirety by reference.

Illumination and Aiming Systems 60, 70

The imaging system 40 further includes the illumination assembly 60 for directing a beam of illumination to illuminate the target bar code 14 and the aiming apparatus 70 for generating a visible aiming pattern 72 (FIG. 8) to aid the user in properly aiming the reader at the target bar code 14. The illumination assembly 60 and the aiming apparatus 70 operate under the control of the imaging circuitry 24. As can best be seen in FIGS. 2-4, in one exemplary embodiment, the illumination assembly 60 comprises a single LED 62 producing a wide illumination angle to completely illuminate the target bar code 14. Obviously, other illumination sources 62 may be used such as a cold cathode lamp (CFL), as would be recognized by one of skill in the art.

The illumination source 62 is supported within the scanning head 11c just behind the transparent window 18 and faces forwardly, that is, toward the target bar code 14. The LED 62 is positioned away from the focusing lens 26 to increase the illumination angle (shown schematically as I in FIG. 7) produced by the illumination 62. Preferably, the active illumination provided by the illumination assembly 60 is intermittent pulse or flash illumination as opposed to continuously on illumination to save on power consumption. Also, preferably, the illumination source LED 62 is red at the higher end of the red wavelength range, e.g., approximate wavelength around 670 nanometers (nm.), since red LEDs of this wavelength have been found to provide for efficient conversion of electrons to photons by the LEDs and from photons back to electrons by the photosensor array 28.

In one exemplary embodiment, the aiming system 70 is a laser aiming apparatus. The aiming pattern 72 may be a pattern comprising a single dot of illumination, a plurality of dots and/or lines of illumination or overlapping groups of dots/lines of illumination (FIG. 8). The laser aiming apparatus 70 includes a laser diode 74, a focusing lens 76 and a pattern generator 77 for generating the desired aiming pattern 77. The laser diode 74, the lens 76 and the pattern generator are supported by a lens holder 78 which extends from the printed circuit board 25b. Typically, the laser diode emits a red colored illumination on the shorter end of the red wavelength range e.g., 625 nm., which is easier to discern to the human eye than red color having a longer wavelength. Alternately, the laser diode 74 may emit a yellow, green or yellow-green colored illumination (approximate wavelengths—green—492-577 nm., yellow—577-597 nm.) because a yellow-green color provides excellent visibility to a user of the reader 10. The aiming apparatus 70 is supported in the scanning head 11c and the aiming pattern exits the head through the transparent window 17.

Operating under the control of the imaging circuitry 24, when the user has properly aimed the reader 10 by directing the aiming pattern 72 onto the target bar code 14, the aiming apparatus 70 is turned off when an image of the target bar code 14 is acquired such that the aiming pattern 72 does not appear in the captured image frame 42. Intermittently, especially when the scanner imaging circuitry 24 is transferring the captured image frame 42 to memory 44 and/or when processing the image, the aiming apparatus 70 is turned back on. If the decoding circuitry 40 cannot decode the imaged bar code 14' and the user in the mean time has not released the trigger 16, the process of acquiring an image of the target bar code 14 set forth above is repeated.

Image Test System 31 and Method of Operation

The CMOS imager 27 of the imaging reader 10 of the present disclosure is constructed to operate with the global shutter mode of FIG. 2 set as the default electronic shutter mode. The imager 27 includes capacitive storage nodes 35 within each pixel of the pixel arrays 33. The capacitive storage nodes 35 maintain a photo-generated signal 45 that forms the analog signal 46 during image read out.

During the operation of the global shutter mode, photons 37 are absorbed into a substrate 39 near the storage nodes 35, generating electrons captured in the storage nodes that undesireably contribute and elevate the value of the photo-generated signal 45 even when the electronic shutter 29 is closed. When the imaging reader 10 of the present disclosure operates in the rolling shutter mode of FIG. 1, the pixels of the pixel arrays 33 are not inaccurately elevated because the photo-generated signal 45 is stored for a very short period of time relative to the global shutter mode. This parasitic light collection condition that occurs in the storage nodes 35 when using the global shutter mode causes images taken in bright constant lighting conditions (such as sunlight) to be distorted and overexposed.

The global shutter mode, as illustrated in FIG. 2 is used in most conditions where ambient lighting is inadequate to substantially affect the stored photo-generated signal 45. In the present disclosure, the global shutter mode is the default shutter mode because the duration of the scanner-generated illumination represented by the flash $F_D$ in FIG. 2 is minimized when compared with the flash of the roller shutter mode of FIG. 1. In addition, the global shutter mode has a higher tolerance to scanner motion than the rolling shutter mode. Alternatively, when bright ambient conditions are detected by the image test system 31 of the present disclosure, the default global shutter mode of FIG. 1 of the imaging reader 10 is switch to the rolling shutter mode of FIG. 2.

The image test system 31 of the present disclosure determines the best electronic shutter mode, either global or rolling relative to environmental conditions, while avoiding the need for additional electronics, optical filtering schemes, or optical filters of prior systems. The image test system 31 operates by software or firmware within the imaging reader 10 to the control the electronic shutter 29 for the optical shutter mode for the environmental conditions at the time of imaging.

Figure 10:
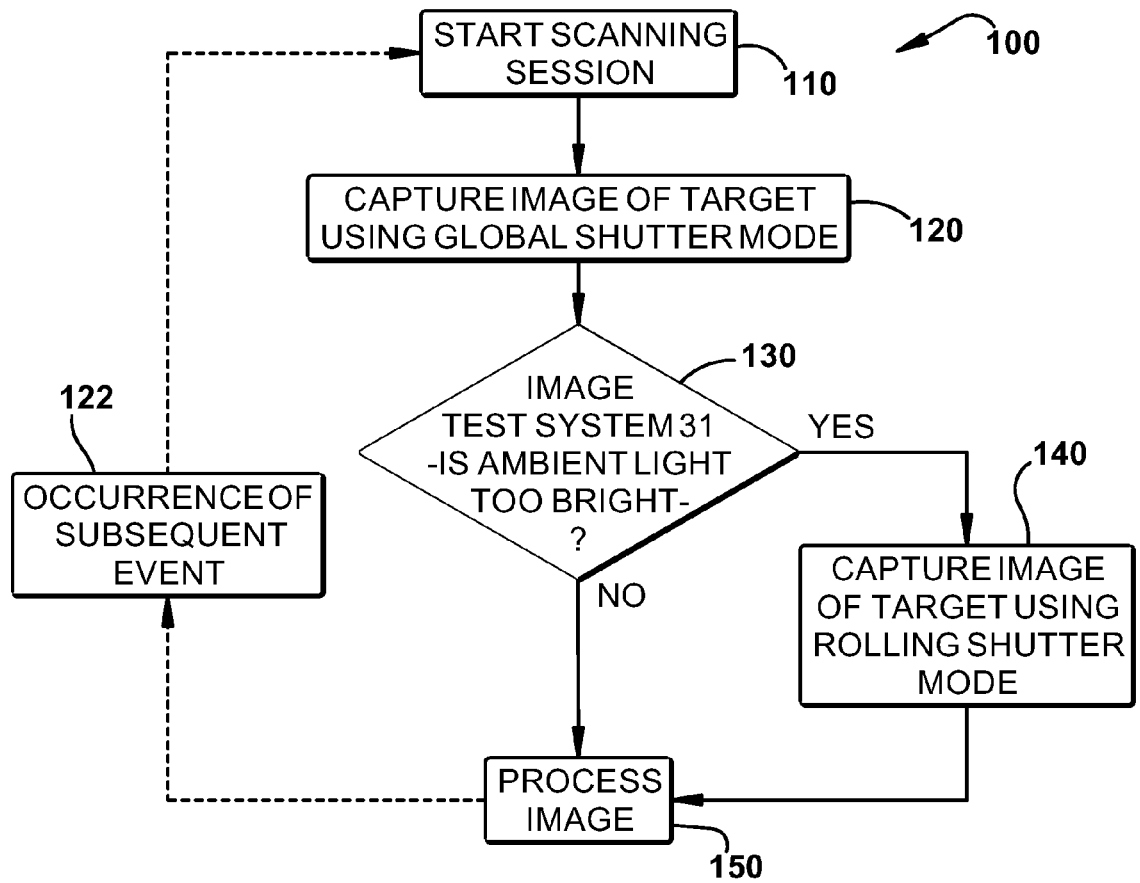
FIG. 10 is a flowchart of an exemplary embodiment of the present disclosure.

Illustrated in FIG. 10 is a flowchart of an exemplary embodiment of the present disclosure illustrating an imaging process 100 of the imaging reader 10. At 110, the imaging process is initiated for example by engaging the trigger 16 of a hand-held scanner or swiping a package in a presentation-type scanner. At 120, an image of the target object is captured using the global shutter mode of FIG. 2. The image captured at 120 acts as a single operation from which the electronic shutter 29 mode is set for all future scans until a subsequent event 122 occurs at which time the imaging process 100 is restarted at 110. Examples of suitable subsequent events 122 include a delay in the operation of the imaging reader 10 for a prescribed period of time, cycling the power of the imaging reader, and the like. At 130, the image test system 31 is activated, determining whether or not the ambient light is too bright. If the determination at 130 is an affirmative, the images of the target objects for all future scans, such as bar codes are captured using a rolling shutter mode of FIG. 1 at 140 and the images are processed at 150 until the occurrence of a subsequent event is reached at 122. If the determination at 130 is negative, the images captured for all future scans are processed by the global shutter mode of FIG. 2 at 150 until the occurrence of a subsequent event is reached at 122.

The image test system 31 evaluates the environmental conditions and determines whether to switch from the default global shutter mode of FIG. 2 to the rolling shutter mode of FIG. 1 through a number of different methods found in the present disclosure. In FIGS. 3 and 5, a separate light detector 152 and/or circuit such as a photo-diode is used to measure ambient lighting. Software or firmware within the imaging reader 10 is programmed with a threshold value that is used for evaluating the measured ambient lighting. If the measured ambient lighting exceeds the programmed threshold value, the electronic shutter 29 is switched from the default global shutter mode of FIG. 2 to the rolling shutter mode of FIG. 1.

Figure 11:
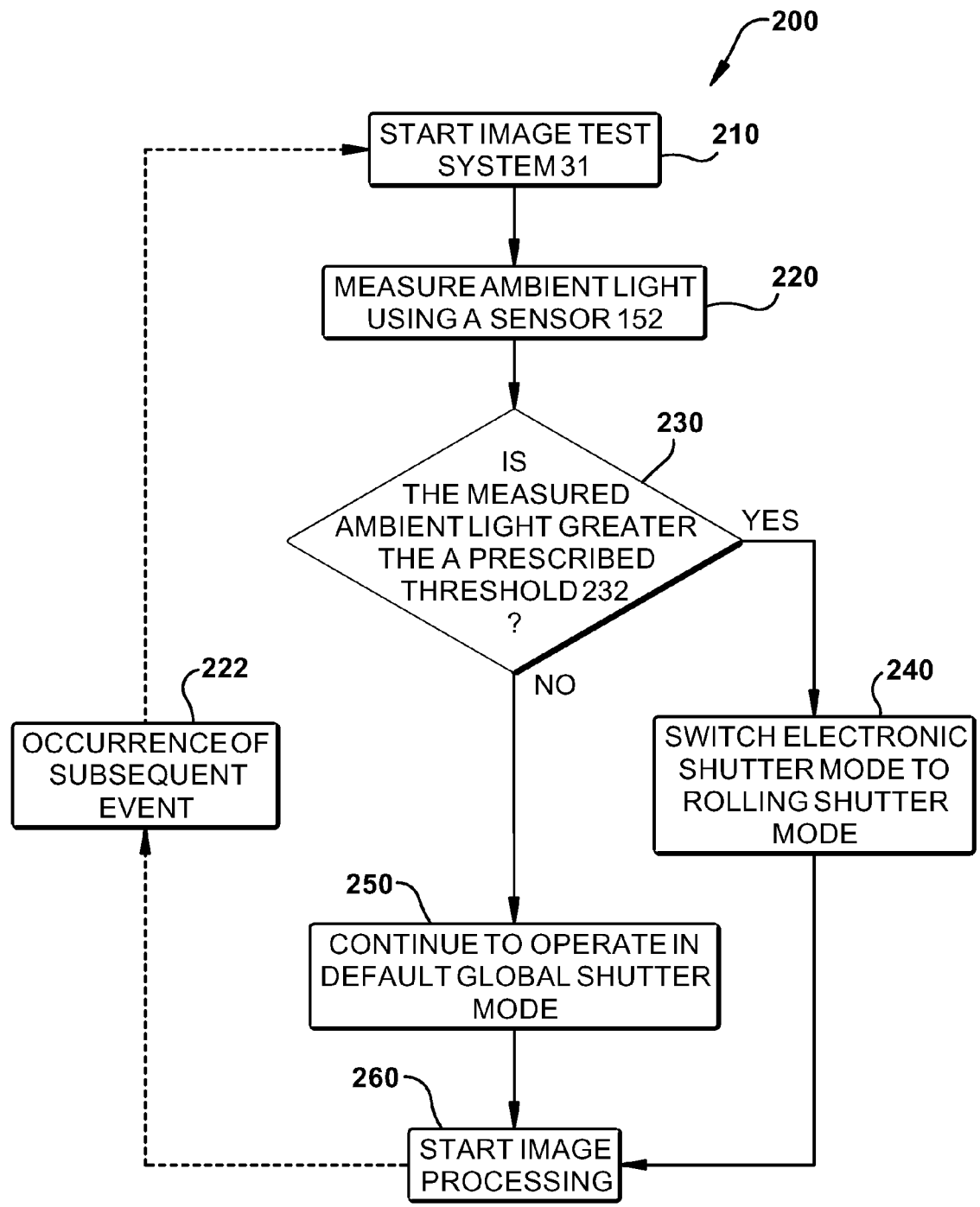
FIG. 11 is a flowchart of another exemplary embodiment of the present disclosure.

FIG. 11 further illustrates another example embodiment of an imaging process 200 using a separate light detector and/or circuit 152 to determine the best electronic shutter 29 mode for operation. At 210, the image test system 31 is initiated. The image test system 31 at 210 acts as a single operation from which the electronic shutter 29 mode is set for all future scans until a subsequent event 222 occurs at which time the imaging process 200 is restarted. Examples of suitable subsequent events 222 include a delay in the operation of the imaging reader 10 for a prescribed period of time, insufficient reading of the target image by the imaging reader 10, cycling the power of the imaging reader, changes detected in lighting to the surrounding environment, and the like.

At 220, the ambient light is measured with a sensor 152 that is remotely located from the reader circuitry 12 as illustrated in FIGS. 3, 4, and 5 or integrated into the reader circuitry as illustrated in FIG. 8. At 230, a determination is made on whether the measured ambient light at 220 is greater than a prescribed threshold 232. If the determination at 230 is an affirmative, the electronic shutter 29 is switched from the global shutter mode of FIG. 2 to the rolling shutter mode of FIG. 1 at 240 and image processing is initiated at 260 until an occurrence of a subsequent event 222 is reached. If the determination at 230 is negative, the process 200 continues to operate in the default global shutter mode of FIG. 2 at 250 and image processing is initiated at 260 until an occurrence of a subsequent event 222 is reached.

Figure 13:
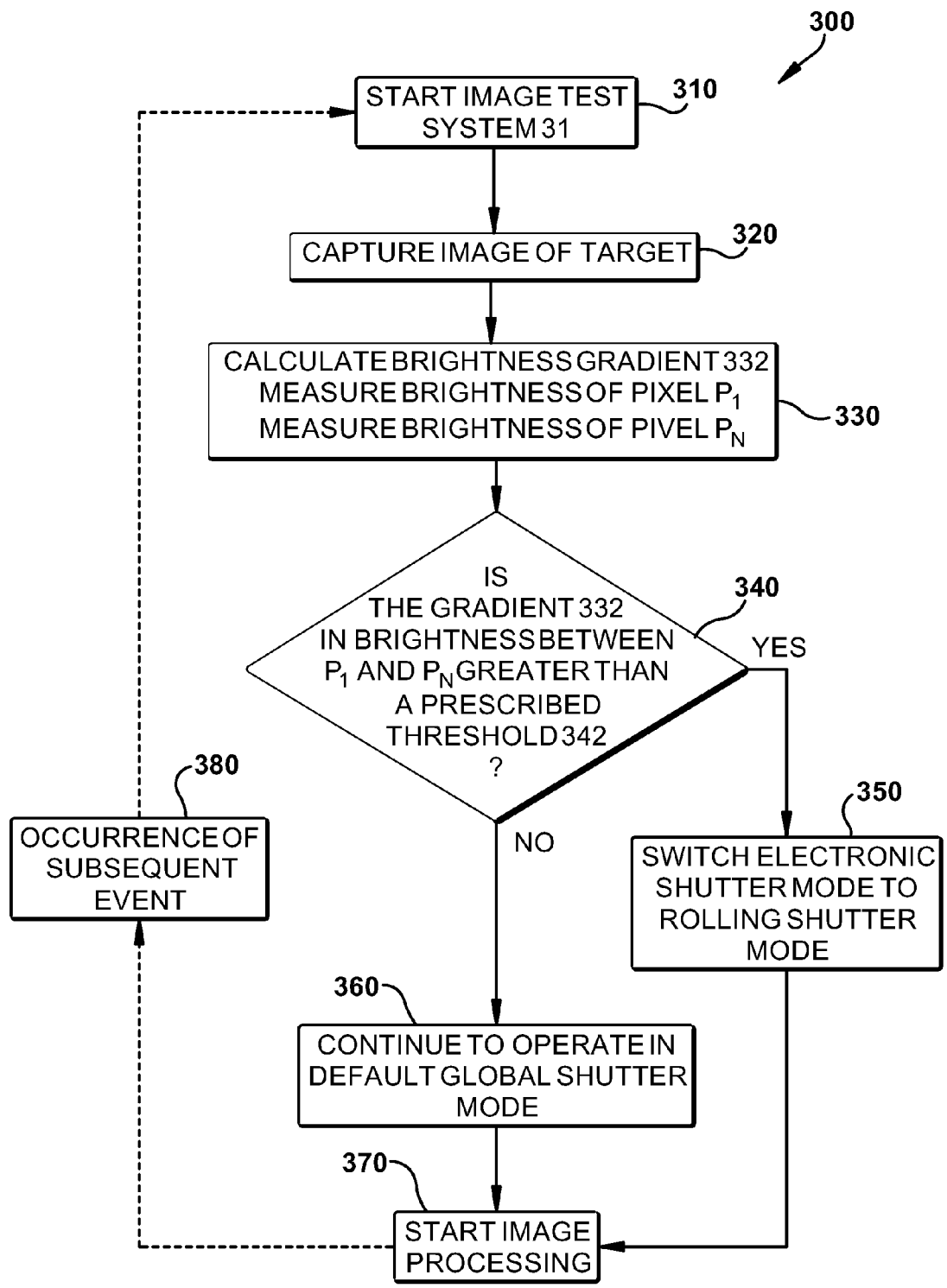
FIG. 13 is a flowchart of a further exemplary embodiment of the present disclosure.

FIG. 13 further illustrates another example embodiment of an imaging process 300 that measures the gradient between image lines that are read out of the sensor array early in the image frame against image lines read out late in the frame to determine the best electronic shutter mode 29 for operation. Stated another way, a comparison is made with a prescribed threshold 340 in the image test system's software or firmware. The comparison with the prescribed threshold 340 is with a brightness gradient 332. The brightness gradient 332 is calculated in an initial scan as the difference between the brightness of at least one pixel read out early in the scan and at least one pixel read out late in the scan. If the brightness gradient 332 is greater than the prescribed threshold 342, the ambient lighting is sufficient to switch the default global shutter mode of FIG. 2 to the rolling shutter mode of FIG. 1.

Figure 12:
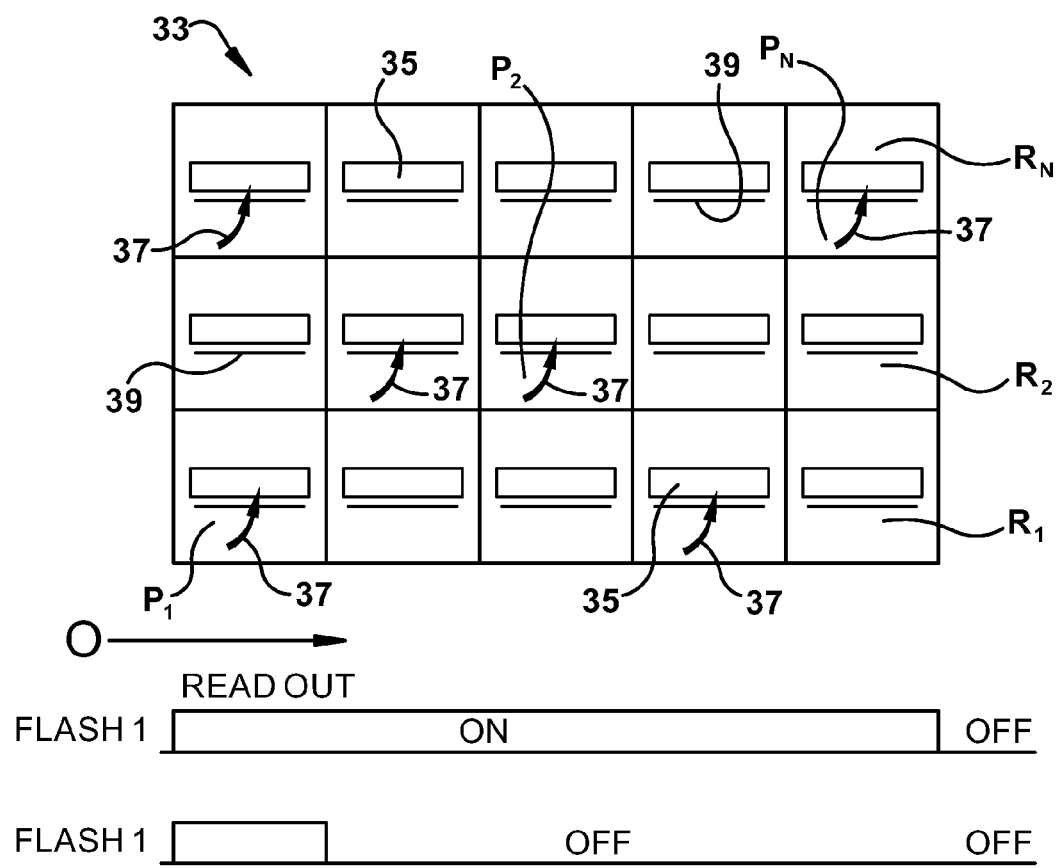
FIG. 12 is a magnified view of an imaging sensor constructed in accordance with one embodiment of the present disclosure.

The physical construct of this process 300 is shown schematically in FIG. 12, wherein the read out of the pixels 33 is initiated in the direction of arrow O. Pixel $P_1$ of row $R_1$ is read out first and pixel $P_N$ of row $R_N$ is read out near the end of the image capture frame. Independent of the shutter mode, whether rolling shutter represented by flash 1 or global represented by flash 2, a gradient generated as a result of the photons 37 being absorbed into a substrate 39 near the storage nodes 35 during the exposure period. The photons 37 generate electrons captured in the storage nodes 35. The signals generated by the pixels become more elevated the longer the time period for the pixels to be read out. Once the brightness gradient 332 between $P_1$ and $P_N$ is measured, it is compared to a prescribed threshold value 342 for determining the proper electronic shutter mode.

The imaging process 300 is further illustrated in the flow chart of FIG. 13. At 310, the image test system 31 is initiated. At 320, an initial capturing of an image of the target object, such as a bar code is obtained. At 330, a calculation is made of the brightness gradient 332 by measuring the brightness of a pixel read out early in the frame and measuring the brightness of a pixel read out later in the frame and taking the difference between the two measurements. At 340, a determination is made as to whether the calculated brightness gradient 332 is greater than a prescribed threshold 342. If the determination at 340 is an affirmative, the electronic shutter mode of the present disclosure is switched from the default global shutter mode of FIG. 2 to the rolling shutter mode of FIG. 1 at 350 and image processing is initiated at 370 until a subsequent event at 380 occurs. If the determination at 340 is negative, the electronic shutter mode is maintained in the default global shutter mode of FIG. 2 at 360 and image processing is initiated at 370 until a subsequent event at 380 occurs. The image test system 31 initiated at 310 acts as a single operation from which the electronic shutter 29 mode is set for all future scans until the subsequent event 380 occurs at which time the imaging process 300 is restarted and/or recalibrated. Examples of suitable subsequent events include, a delay in the operation of the imaging reader 10 for a prescribed period of time, cycling the power of the imaging reader, insufficient reading of the target image by the imaging reader 10, changes detected in lighting to the surrounding environment, and the like.

Figure 14:
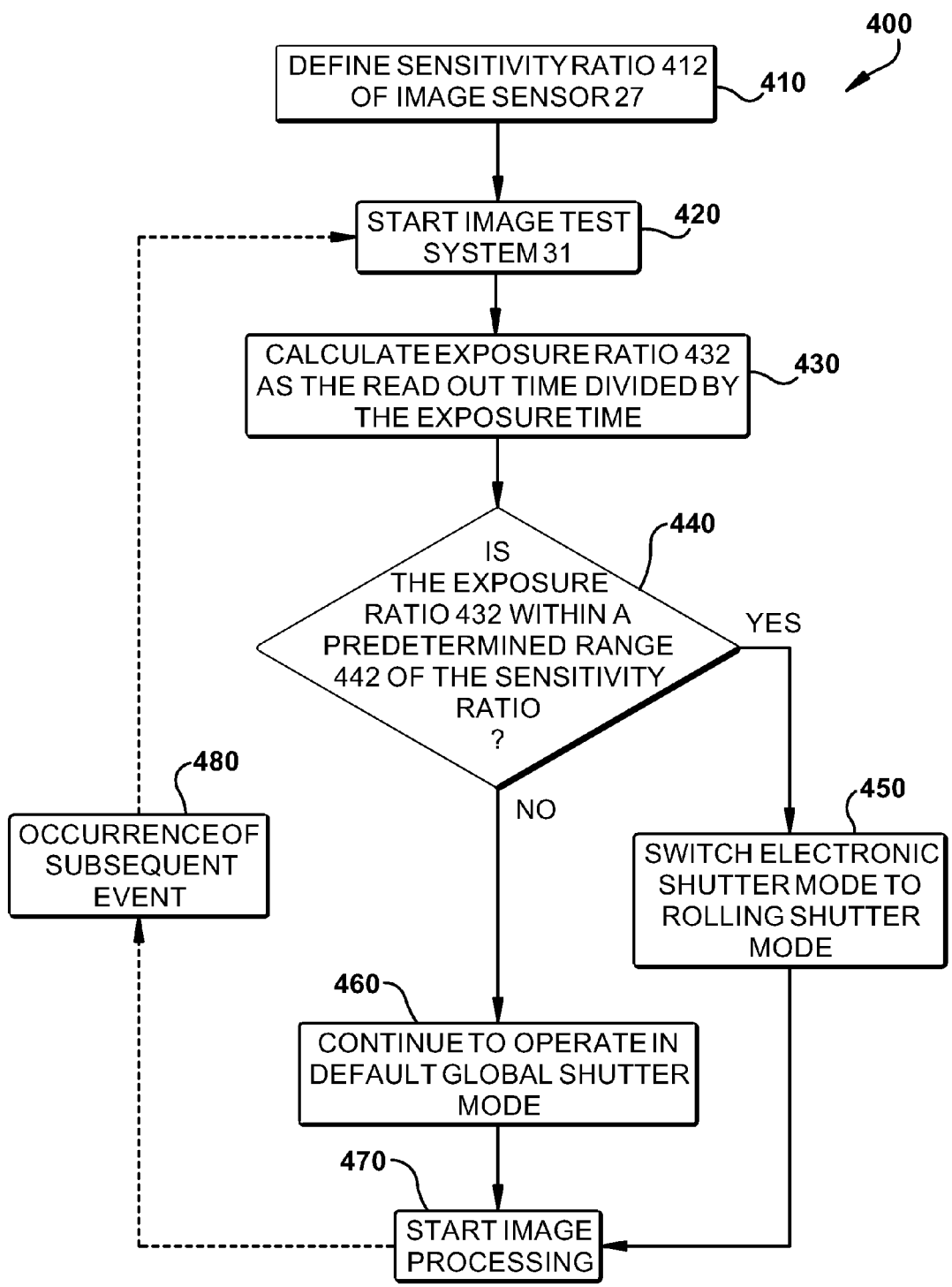
FIG. 14 is a flowchart of yet another exemplary embodiment of the present disclosure.

FIG. 14 further illustrates another example embodiment of an imaging process 400 that uses exposure time to determine the best electronic shutter 29 mode for operation. At 410, a sensitivity ratio 412 of the image sensor 27 is defined in the software or firmware of the imaging reader 10. The image sensor 27 selected for the imaging reader's particular application will include a characterized value for the sensitivity ratio 412 between a photodiode 41 (see FIG. 8) and storage or sensed nodes 35 (see FIGS. 8 and 12) that maintain the photo-generated signal 45. The photodiode 41 detects light with the electronic shutter 29 is open, allowing an exposure of light upon the pixels 33 of the sensor array 27 and transfers a signal to the sensed nodes 35 when the exposure is finished or closes. At 420, the image test system 31 is initiated. The image test system 31 at 420 acts as a single operation from which the electronic shutter 29 mode is set for all future scans until a subsequent event 480 occurs at which time the imaging process 400 is restarted. Examples of suitable subsequent events 480 include a delay in the operation of the imaging reader 10 for a prescribed period of time, cycling the power of the imaging reader, insufficient reading of the target image by the imaging reader 10, changes detected in lighting to the surrounding environment, and the like.

At 430, an exposure ratio 432 is calculated that is the read out time of the pixels 33 in the sensor array 27 divided by the exposure time provided by the signals of the photodiode 41. At 440, a determination is made as to whether the exposure ratio 432 is within a predetermined range 442 of the sensitivity ratio 412. The predetermined range 442 is a value programmed into the software or firmware at the design of the application for the imaging reader 10 or that can be altered ("reprogrammed") to accommodate changes in the application of the imaging reader. If the determination at 440 is an affirmative, then the lines that are read out from subsequent scans from the sensor 27 will be affected by the ambient light and therefore the electronic shutter 29 is switched from the global shutter mode of FIG. 2 to the rolling shutter mode of FIG. 1 at 450 and image processing is initiated at 470 until a subsequent event occurs. If the determination at 440 is negative, the process 400 continues to operate in the default global shutter mode of FIG. 2 at 460 and image processing is initiated at 470 until a subsequent event occurs.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An imaging system for scanning and decoding a target object, the imaging system comprising:
   a scanning arrangement comprising a sensor assembly for capturing an image from a target object, the sensor assembly having a field-of-view focused by an optical arrangement onto a sensor array located within the sensor assembly;
   a programmable microprocessor located within and coupled to said scanning arrangement that operates an electronic shutter for controlling the exposure time of pixels located in said sensor array, the electronic shutter having first and second modes of exposure; and
   an image test control system associated with said scanning arrangement for evaluating lighting conditions surrounding the imaging system by performing at least one of calculating a brightness gradient by taking a difference between a first brightness value provided by a pixel read out early in the test image frame and a second brightness value provided by a pixel read out late in the test image frame, or calculating an exposure ratio,
   wherein the image test control system selects an optimum mode for imaging based on said evaluation between said first mode of exposure and said second mode of exposure based on at least one of
      comparing said brightness gradient to a prescribed threshold such that if said brightness gradient is greater than the prescribed threshold, said electronic shutter mode is switched from said first mode of exposure to said second mode of exposure for future imaging operations, or
      comparing said exposure ratio to a sensitive ratio such that if said comparison is within a predetermined range of said sensitive ratio, said electronic shutter mode is switched from said first mode of exposure to said second mode of exposure for future imaging operations.

2. The imaging system of claim 1 wherein said first mode of exposure is a global shutter mode and said second mode of exposure is a rolling shutter mode.

3. The imaging system of claim 1 wherein said image test control system is a programmable assembly coupled to or within said microprocessor.

4. The imaging system of claim 1 wherein said image test control system captures a single test image using said first mode of exposure to measure and evaluate the lighting conditions during the test image and thereby selects an optimum mode for future imaging based on said evaluating and measuring of the test image such that the optimum mode is selected between said first mode of exposure and said second mode of exposure.

5. The imaging system of claim 4 wherein said first mode of exposure is a global shutter mode and said second mode of exposure is a rolling shutter mode.

6. The imaging system of claim 1 wherein said image test control system associated with said scanning arrangement is initiated upon the occurrence of a subsequent event.

7. The imaging system of claim 5 wherein said image test control system associated with said scanning arrangement is initiated upon the occurrence of a subsequent event.

8. The imaging system of claim 1 further comprising a photodiode coupled to said scanning arrangement providing a signal to said image test control system, the signal being used to evaluate lighting conditions surrounding the imaging system and selecting an optimum mode for imaging based on said evaluation between said first mode of exposure and said second mode of exposure.

9. The imaging system of claim 8 wherein said microprocessor further comprises a threshold such that if said signal is greater than said threshold the image test control system switches from said first exposure mode to said second exposure mode for all future imaging and if said signal is less than said threshold the image test control system maintains said first exposure mode for all further imaging.

10. A method for selecting an optimum electronic shutter mode used for imaging and decoding a target object with an imaging reader, the method comprising:
    capturing a test image of a target object with an imaging reader having an electronic shutter operating in a first exposure mode;
    measuring the ambient lighting surrounding the imaging reader during the capturing of said test image of the target object with a processor located within a scanning arrangement of the imaging reader, wherein measuring the ambient lighting comprises calculating a brightness gradient by taking a difference between a first brightness value provided by a pixel read out early in a frame of the test image and a second brightness value provided by a pixel read out late in the frame of the test image
    evaluating the measured ambient lighting with said processor against a prescribed threshold programmed in said processor; and
    switching said electronic shutter mode from said first exposure mode to a second exposure mode when said measured ambient lighting is greater than said prescribed threshold for future imaging operations and maintaining said electronic shutter mode in said first exposure mode when said measured ambient lighting is less than said prescribed threshold for future imaging operations.

11. The method of claim 10 wherein said first exposure mode is a global shutter mode and said second exposure mode is a rolling shutter mode, the step of measuring the ambient lighting further comprising providing a light sensor coupled to said scanning arrangement for measuring the ambient lighting surrounding the imaging reader during the capturing of the test image.

12. The method of claim 10 wherein the step of measuring the ambient lighting comprises calculating an exposure ratio and evaluating the measured ambient lighting further comprises comparing said exposure ratio to a sensitivity ratio such that if said comparison is within a predetermined range said electronic shutter mode is switch from said first exposure mode to said second exposure mode for future imaging operations.

13. The method of claim 10 further comprising the step of initiating said image test control system upon an occurrence of a subsequent event.

14. The method of claim 10 further comprising the step of interrupting future imaging operations with a reinitiating said method for selecting an optimum electronic shutter mode used for imaging and decoding a target object with an imaging reader upon an occurrence of a subsequent event.

15. A method for selecting an optimum electronic shutter mode used for imaging and decoding a target object with an imaging reader, the method comprising:

capturing a test image of a target object with an imaging reader having an shutter means operating in a first exposure mode;

measuring the ambient lighting surrounding the imaging reader during the capturing of said test image of the target object with a processing means coupled to said imaging reader, wherein said measuring the ambient lighting is achieved by calculating an exposure ratio;

evaluating the measured ambient lighting with said processing means against a sensitive ratio programmed in said processing means; and switching said shutter means mode from said first exposure mode to a second exposure mode when said exposure ratio is at or less than a programmed value from said sensitive ratio for future imaging operations and maintaining said shutter means mode in said first exposure mode when said exposure ratio is greater than said programmed value from said sensitive ratio for future imaging operations.

16. An imaging reader for scanning and decoding a target object, the imaging reader comprising:

a scanning arrangement comprising a sensor assembly for capturing an image from a target object, the sensor assembly having a field-of-view focused by an optical arrangement onto a sensor array located within the sensor assembly;

a programmable microprocessor located within and coupled to said scanning arrangement operating an electronic shutter for controlling the exposure time of pixels located in said sensor array, the electronic shutter having a global shutter mode and a rolling shutter mode;

an image test control system associated with said scanning arrangement for evaluating lighting conditions surrounding the imaging system and for assigning a brightness value based on the evaluation, the image test control system further selects an optimum mode for future images by said imaging reader based on said brightness value by selecting between said global shutter mode and said rolling shutter mode, wherein said brightness value is a brightness gradient calculated by taking the difference between a first brightness value provided by a pixel read out early in the test image frame and a second brightness value provided by a pixel read out late in the test image frame; and a threshold programmed into said microprocessor such that if said brightness value is at or less than a programmed value in said microprocessor from said threshold said electronic shutter is switch from said global shutter mode to said rolling shutter mode for future imaging operations and if said brightness value is greater than said programmed value in said microprocessor from said threshold said electronic shutter mode is set at said global shutter mode for future imaging operations.

17. The imaging reader of claim 16 wherein brightness value is an exposure ratio calculated by the read out time of the sensor array divided by the exposure time of the sensor array and said threshold is established by a sensitivity ratio of said sensor array.

* * * * *

UNITED STATES PATENT AND TRADEMARK OFFICE
CERTIFICATE OF CORRECTION

| | | |
|---|---|---|
| PATENT NO. | : 7,815,120 B2 | |
| APPLICATION NO. | : 12/333844 | |
| DATED | : October 19, 2010 | |
| INVENTOR(S) | : Carlson | |

It is certified that error appears in the above-identified patent and that said Letters Patent is hereby corrected as shown below:

ON THE TITLE PAGE

1. On the Title Page, in Item (56), under "OTHER PUBLICATIONS", in Column 2, Line 1, delete "Leconte;" and insert -- Leconte, --, therefor.

2. On the Title Page, in Item (56), under "OTHER PUBLICATIONS", in Column 2, Line 2, delete "2066," and insert -- 2006, --, therefor.

IN THE DRAWINGS

3. In Fig. 11, Sheet 9 of 12, for Tag "230", in Line 4, delete "THE" and insert -- THAN --, therefor.

4. In Fig. 13, Sheet 11 of 12, for Tag "330", in Line 3, delete "PIVEL" and insert -- PIXEL --, therefor.

IN THE SPECIFICATION

5. In Column 1, Lines 41-42, delete "photodector" and insert -- photodetector --, therefor.

6. In Column 1, Lines 60-61, delete "florescent" and insert -- fluorescent --, therefor.

7. In Column 5, Line 65, delete "is the in" and insert -- is in the --, therefor.

8. In Column 6, Line 47, delete "as a a" and insert -- as a --, therefor.

9. In Column 10, Line 17-18, delete "undesireably" and insert -- undesirably --, therefor.

Signed and Sealed this
Eleventh Day of February, 2014

Michelle K. Lee
*Deputy Director of the United States Patent and Trademark Office*

CERTIFICATE OF CORRECTION (continued)
U.S. Pat. No. 7,815,120 B2

IN THE CLAIMS

10. In Column 13, Line 44, in Claim 1, delete "of" and insert -- of: --, therefor.